(12) United States Patent
Moniz et al.

(10) Patent No.: US 6,935,837 B2
(45) Date of Patent: Aug. 30, 2005

(54) METHODS AND APPARATUS FOR ASSEMBLING GAS TURBINE ENGINES

(75) Inventors: Thomas Ory Moniz, Loveland, OH (US); Robert Joseph Orlando, West Chester, OH (US); John Christopher Brauer, Lawrenceburg, IN (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 10/376,892

(22) Filed: Feb. 27, 2003

(65) Prior Publication Data

US 2004/0168443 A1 Sep. 2, 2004

(51) Int. Cl.[7] ................................................. F03D 11/00
(52) U.S. Cl. ................. 415/190; 415/209.3; 415/209.4; 60/39.31; 60/268
(58) Field of Search .............................. 415/142, 182.1, 415/190, 209.2, 209.3, 209.4; 60/39.31, 268

(56) References Cited

U.S. PATENT DOCUMENTS

| | | | |
|---|---|---|---|
| 4,030,288 A | 6/1977 | Davis et al. | |
| 4,418,528 A | 12/1983 | Pellow | |
| 4,744,214 A | 5/1988 | Monsarrat et al. | |
| 4,750,327 A | 6/1988 | Wohrl | |
| 4,934,140 A | 6/1990 | Dennison et al. | |
| 5,022,145 A | 6/1991 | Brawerman | |
| 5,483,792 A | 1/1996 | Czachor et al. | |
| 5,575,145 A | 11/1996 | O'Neill et al. | |
| 6,358,001 B1 | 3/2002 | Bosel et al. | |
| 6,435,813 B1 * | 8/2002 | Rieck et al. | 415/115 |
| 6,439,841 B1 | 8/2002 | Bosel | |
| 6,672,833 B2 * | 1/2004 | MacLean et al. | 415/196 |
| 6,684,626 B1 * | 2/2004 | Orlando et al. | 60/268 |

* cited by examiner

Primary Examiner—Edward K. Look
Assistant Examiner—Dwayne J. White
(74) Attorney, Agent, or Firm—William Scott Andes; Armstrong Teasdale LLP

(57) ABSTRACT

A method enables a gas turbine engine including a first rotor assembly and a second rotor assembly coupled in axial flow communication downstream from the first rotor assembly to be assembled. The method comprises coupling an upstream end of an extension duct to an outlet of the first rotor assembly, wherein the extension duct includes a plurality of panels coupled circumferentially, and coupling a downstream end of the extension duct to an inlet of the second rotor assembly using at least one fish mouth seal.

20 Claims, 3 Drawing Sheets

METHODS AND APPARATUS FOR ASSEMBLING GAS TURBINE ENGINES

BACKGROUND OF THE INVENTION

This invention relates generally to gas turbine engines, and more specifically to methods and apparatus for assembling gas turbine engines.

At least some known gas turbine engines include a core engine having, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor.

An operating efficiency of known gas turbine engines is at least partially limited by combustor operating temperatures. To facilitate increased combustor temperatures, at least some known gas turbine engines use a smaller diameter core engine in comparison to a diameter of the low pressure turbine. More specifically, reducing a fan corrected tip speed and reducing fan pressure ratio facilitates increasing the engine efficiency.

Generally an engine is designed as a compromise between performance, cost, and weight. Despite the thermodynamic benefits of operating at higher temperatures, the increased temperatures may also cause problems in designing a low pressure turbine that is operable with a high efficiency and a reasonable number of low pressure turbine stages. More specifically, as a result of the increased high pressure turbine operating temperature, a larger diameter low pressure turbine may be required to achieve a desired operating efficiency with a reasonable number of stages. However, known gas turbine engines are limited in the radius change between the exit of the high pressure rotary assembly and the low pressure turbine.

BRIEF SUMMARY OF THE INVENTION

In one aspect, a method for assembling a gas turbine engine including a first rotor assembly and a second rotor assembly coupled in axial flow communication downstream from the first rotor assembly is provided. The method comprises coupling an upstream end of an extension duct to an outlet of the first rotor assembly, wherein the extension duct includes a plurality of panels coupled circumferentially, and coupling a downstream end of the extension duct to an inlet of the second rotor assembly using at least one fish mouth seal.

In another aspect of the invention, an annular turbine frame for a gas turbine engine is provided. The turbine frame comprises a plurality of panels coupled together to form an extension duct. The extension duct includes a radially outer panel portion and a radially inner panel portion. At least one of the radially outer and radially inner panel portions is coupled within the gas turbine engine by at least one fish mouth seal.

In a further aspect, a gas turbine engine is provided. The gas turbine engine comprises a first rotor assembly, a second rotor assembly, and an extension duct. The second rotor assembly is downstream from the first rotor assembly, such that the second rotor assembly is coupled in axial flow communication with the first rotor assembly. The extension duct extends from an outlet of the first rotor assembly to an inlet of the second rotor assembly, and includes an upstream end, a downstream end, and a plurality of panels coupled together circumferentially therebetween. At least one of the extension duct upstream or downstream ends is coupled within the gas turbine engine by at least one fish mouth seal.

DETAILED DESCRIPTION OF THE INVENTION

Figure 1:
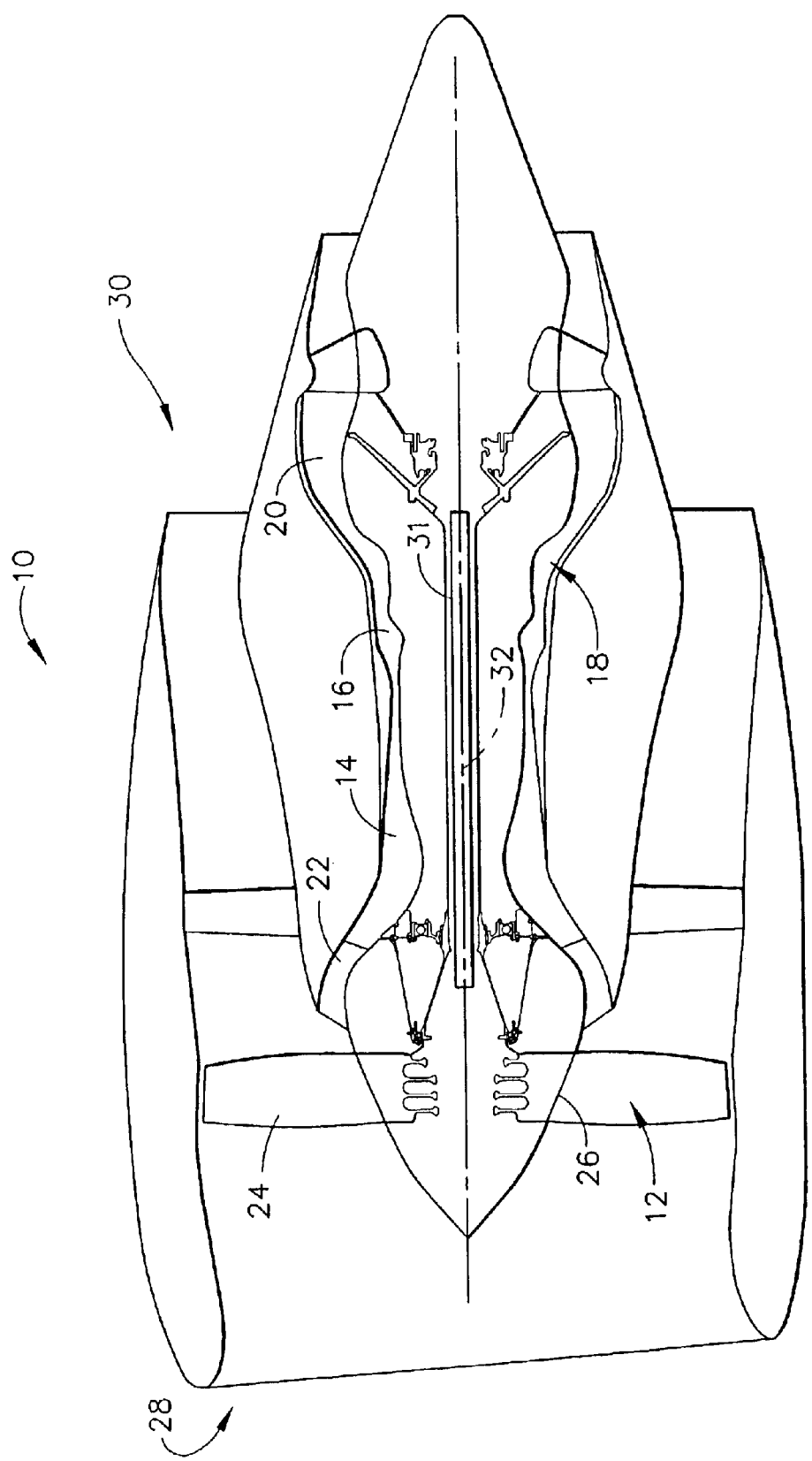
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
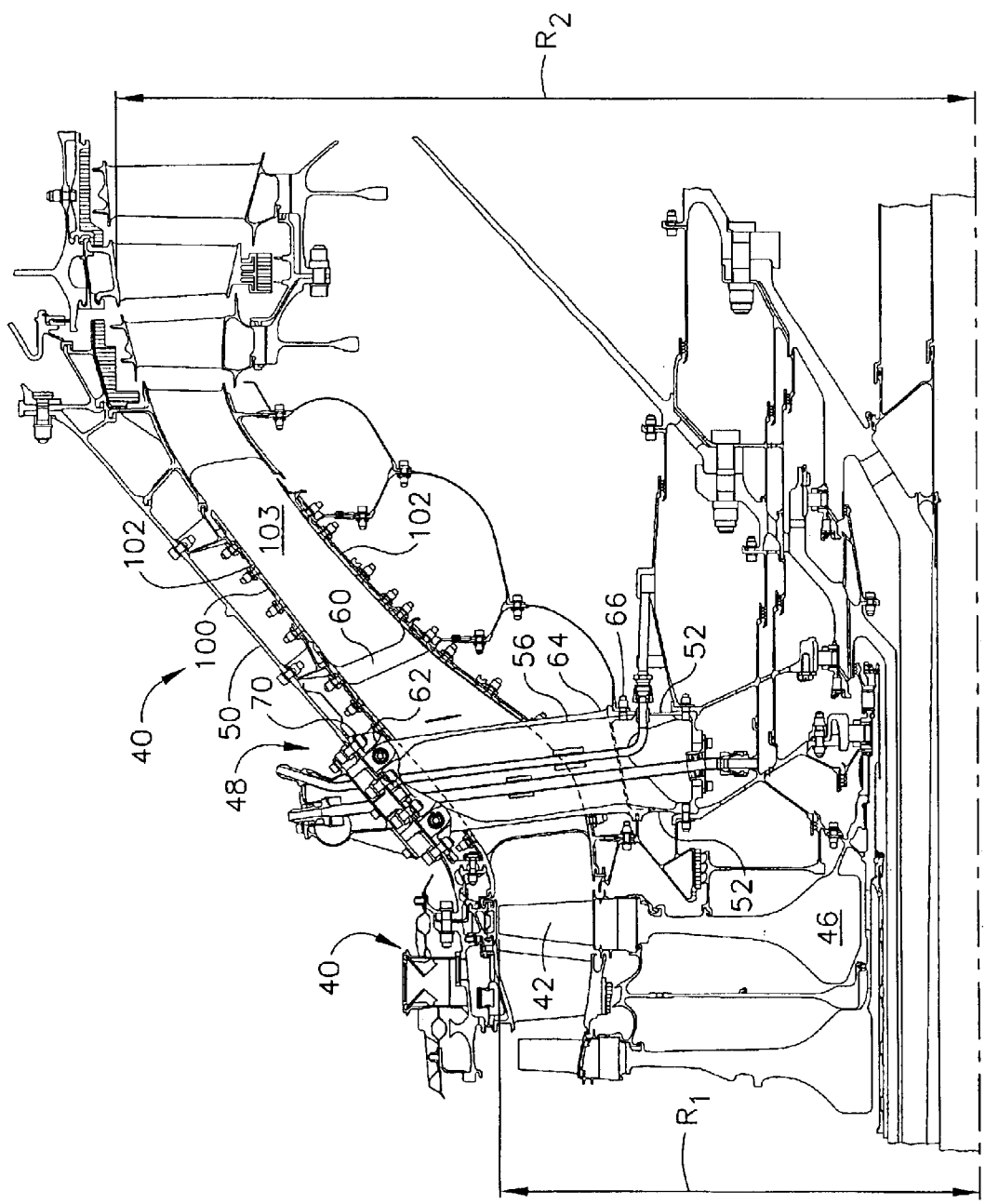
FIG. 2 is partial cross-sectional schematic view of a portion of the engine shown in FIG. 1.
Figure 3:
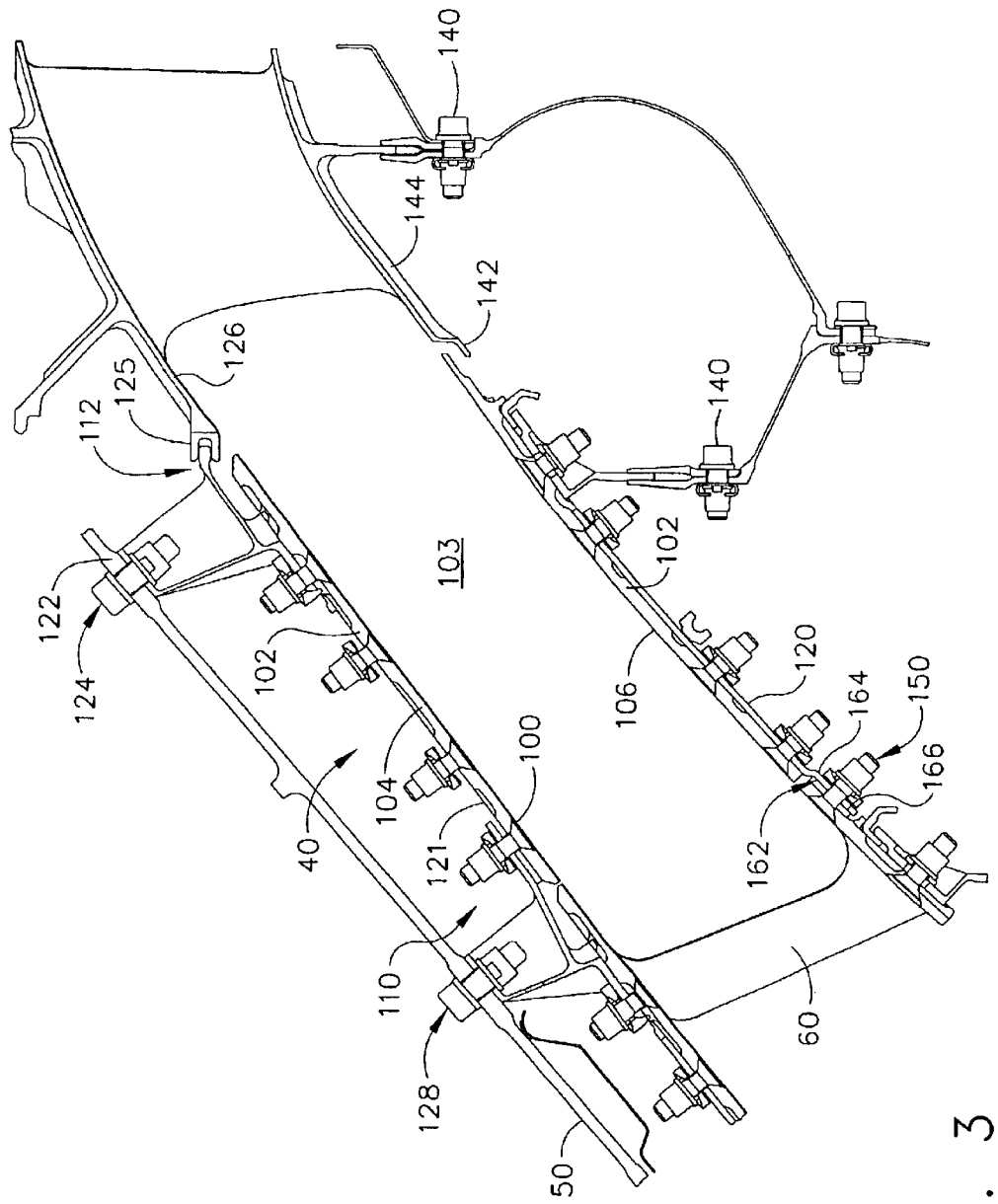
FIG. 3 is an enlarged view of the engine shown in FIG. 1 and taken along area 3.

FIG. 2 is partial cross-sectional schematic view of an extension duct assembly 40 for use with engine 10. FIG. 3 is an enlarged view of engine 10 taken along area 3 (shown in FIG. 2). Turbine 18 includes a plurality of stages 40, and each stage includes a row of rotor blades 42 and a row of stationary vanes. In the exemplary embodiment, rotor blades 42 are supported by rotor disks 46.

A load-bearing annular turbine frame 48 extends downstream from turbine 18. Frame 48 includes a radially outer structural member or casing 50 that extends circumferentially around turbine 18, and a radially inner member or hub 52 that is coaxially aligned with respect to casing 50 about an axis of rotation of turbine engine 10. Hub 52 is radially inward from casing 50 and a plurality of circumferentially spaced apart hollow struts 56 extend radially between casing 50 and hub 52.

Frame 48 also includes a plurality of conventional fairings 60, each of which surrounds a respective strut 56 to facilitate shielding each strut from combustion gases flowing through turbine engine 10. More specifically, each strut 56 includes a radially outer end 62 and an opposite radially inner end 64. In the exemplary embodiment, each strut radially inner end 64 is coupled to hub 52 with a bolted connection 66. In an alternative embodiment, strut inner ends 64 are coupled by welding to hub 52. In a further alternative embodiment, strut inner ends 64 are integrally formed with hub 52. A plurality of collars 70 surround, and are integrally formed with, each strut radially outer end 64, to removably couple each strut outer ends 64 to casing 50 such that loads induced to hub 52 are transmitted into casing 50 through collars 70.

An extension duct 100 extends downstream from turbine frame 48. Specifically, extension duct 100 includes a plurality of panels 102 coupled together circumferentially such that a flow passageway 103 is defined through extension duct 100. In the exemplary embodiment, twelve panels 102 are coupled together circumferentially. More specifically, panels 102 define a radially outer panel portion 104 and a radially inner panel portion 106 that is spaced radially inwardly from panel portion 104 such that flow passageway 103 is defined therebetween. Panel portions 104 and 106 extend axially between an upstream end 110 of extension duct 100 and a downstream end 112 of extension duct 100. A doubler panel 120 is coupled against extension duct radially inner panel portion 106 to provide structural support to extension duct 100.

Extension duct 100 radially outer panel portion 104 is coupled to low pressure turbine casing 122 at aft end 112 by a bolted connection 124, such that extension duct aft end 112 is positioned adjacent a leading edge 125 of a low pressure turbine nozzle outer band 126. Radially outer panel portion 104 is also coupled to high pressure turbine casing 50 by a bolted connection 128, such that extension duct upstream end 110 is downstream of fairings 60. A doubler panel 121 is also coupled against extension duct radially outer panel portion 104 to provide structural support to extension duct 100.

Radially inner panel portion 106 is retained in position at aft end 112 by at least one fish mouth seal 140. Specifically, seals 140 facilitate retaining extension duct aft end 112 in position relative to a leading edge 142 of a low pressure turbine nozzle inner band 144. During operation, seals 140 permit extension duct 100 to shift radially to accommodate thermal expansion and/or thermal stresses induced therein, such that sealing of extension duct 100 with respect to low pressure turbine nozzle inner band 144 is facilitated. Seals 140 also facilitate reducing wear and maintenance costs to frame 48. Radially inner panel portion 106 is retained in position at upstream end 110 by a fastener 150 that extends through a lapped joint 162 formed such that a portion 164 of doubler panel 120 is positioned against a radially inner surface 166 of an aft fairing 60.

Extension duct 100 extends axially between high pressure turbine 18 and low pressure turbine 20 such that fluid flowing axially therethrough therein is also channeled radially outwardly by extension duct 100. More specifically, at upstream end 110, extension duct radially outer panel portion 104 defines an inlet radius $R_1$ that is smaller than an outlet radius $R_2$ defined by radially outer panel portion 104 at extension duct aft end 112. Accordingly, extension duct 100 accommodates an increased radius change in the flowpath between high pressure turbine 18 and low pressure turbine 20. In one embodiment, a ratio of outlet radius $R_2$ to inlet radius $R_1$ is approximately equal to 1.75. In an alternative embodiment, a ratio of outlet radius $R_2$ to inlet radius $R_1$ is more or less than approximately 1.75. More specifically, extension duct 100 accommodates an increased radius change that is larger than radius changes employed by known gas turbine engines. The increased outlet radius $R_2$ facilitates low pressure turbine 20 operating with an increased operating efficiency in comparison to other known low pressure turbines that have an increased number of turbine stages. In the exemplary embodiment, low pressure turbine 20 is a counter-rotating turbine. Alternatively, low pressure turbine 20 is a conventionally rotating turbine.

During operation, extension duct 100 accommodates an increased radius change between high and low pressure turbines 18 and 20, respectively, in comparison to other known gas turbine engines. More specifically, the increased radius change enables low pressure turbine 20 to operate at the same, or an increased, operating efficiency as other known low pressure turbines that include more turbine stages. As a result, extension duct 100 facilitates increasing operating efficiencies of engine 10, without the weight sacrifice associated with the additional low pressure turbine stages. Furthermore, fish mouth seals 140 accommodate thermal expansion and thermal stresses that may be induced to extension duct 100 while facilitating external sealing of flow passageway 103.

The above-described airframe is cost-effective and highly reliable. The frame includes a load-bearing portion coupled to an extension duct. The extension duct accommodates an increased and desired radius change in the flowpath between the high and low pressure turbines. The increased radius change enables the gas turbine engine to operate with a larger diameter low pressure turbine that has an operating efficiency that is typically achieved with an increased number of turbine stages in at least some known low pressure turbines. Furthermore, the extension duct is movable radially to accommodate thermal expansion differences between the high and low pressure turbines. As a result, the extension duct overcomes known manufacturing gas turbine engine radius change limits in a cost-effective and reliable manner.

Exemplary embodiments of turbine frames are described above in detail. The frames are not limited to the specific embodiments described herein, but rather, components of each assembly may be utilized independently and separately from other components described herein. Each extension duct component can also be used in combination with other turbine frame components. Furthermore, each extension duct component may also be used with other gas turbine engine configurations.

While the invention has been described in terms of various specific embodiments, those skilled in the art will recognize that the invention can be practiced with modification within the spirit and scope of the claims.

What is claimed is:

1. A method for assembling a gas turbine engine including a first rotor assembly and a second rotor assembly coupled in axial flow communication downstream from the first rotor assembly, said method comprising:
    coupling an upstream end of an extension duct to an outlet of the first rotor assembly, wherein the extension duct includes a plurality of panels coupled circumferentially; and
    coupling a downstream end of the extension duct to an inlet of the second rotor assembly using at least one fish mouth seal.

2. A method in accordance with claim 1 wherein coupling an upstream end of an extension duct further comprises:
    coupling a doubler panel against at least one of the panels; and
    coupling the extension duct upstream end within the gas turbine engine using a lapped joint extending from the doubler panel.

3. A method in accordance with claim 1 wherein coupling a downstream end of the extension duct further comprises coupling a downstream end of the extension duct within the gas turbine engine such that the extension duct extends axially between a high pressure turbine and a low pressure turbine.

4. A method in accordance with claim 1 wherein coupling a downstream end of the extension duct further comprises coupling a downstream end of the extension duct within the gas turbine engine such the downstream end defines a first radius measured with respect to an axis of rotation of the turbine, and such that the upstream end defines a second radius measured with the axis of rotation, wherein a ratio of the first radius to the second radius is approximately 1.75.

5. A method in accordance with claim 1 wherein coupling a downstream end of the extension duct to an inlet of the second rotor assembly using at least one fish mouth seal further comprises coupling the extension duct downstream end to a counter-rotating rotary assembly.

6. An annular turbine frame for a gas turbine engine, said turbine frame comprising a plurality of panels coupled together to form an extension duct, said extension duct comprising a radially outer panel portion and a radially inner panel portion, at least one of said radially outer panel portion and said radially inner panel portion is coupled within the gas turbine engine by at least one fish mouth seal.

7. A turbine frame in accordance with claim 6 further comprising at least one doubler panel positioned against said radially inner panel portion.

8. A turbine frame in accordance with claim 7 wherein said at one doubler panel is coupled to said turbine frame by a lapped joint.

9. A turbine frame in accordance with claim 6 wherein an upstream portion of said extension duct has a first radius measured with respect to an axis of rotation of the gas turbine engine, a downstream portion of said extension duct has a second radius measured with respect to the axis of rotation, said second radius larger than said first radius, such that a ratio of said second radius to said first radius is approximately equal to 1.75.

10. A turbine frame in accordance with claim 6 wherein said extension duct extends between a first turbine and a second turbine.

11. A turbine frame in accordance with claim 6 wherein said plurality of panels further comprises twelve panels coupled together circumferentially.

12. A turbine frame in accordance with claim 6 wherein said at least one fish mouth seal configured to substantially control fluid leakage from said extension duct.

13. A gas turbine engine comprising:

a first rotor assembly;

a second rotor assembly downstream from said first rotor assembly, said second rotor assembly axially coupled in a flow communication with said first rotor assembly, an extension duct extending from an outlet of said first rotor assembly to an inlet of said second rotor assembly, said extension duct comprising an upstream end, a downstream end, and a plurality of panels coupled circumferentially therebetween, at least one of said extension duct upstream end and said extension duct downstream end coupled to said turbine engine by at least one fish mouth seal.

14. A gas turbine engine in accordance with claim 13 wherein said first rotor assembly is a high pressure turbine, said second rotor assembly is a low pressure turbine, said extension duct coupled to a casing extending circumferentially around said second rotor assembly by at least one fastener.

15. A gas turbine engine in accordance with claim 13 wherein said extension duct further comprises a doubler panel, a radially inner panel portion, and a radially outer panel portion, said doubler panel comprising at least one lapped joint and is coupled against at least one of said radially inner panel portion and said radially outer panel portion.

16. A gas turbine engine in accordance with claim 13 wherein said extension duct upstream end coupled within said gas turbine engine by a lapped joint.

17. A gas turbine engine in accordance with claim 13 wherein said gas turbine engine has an axis of rotation, said extension duct upstream end has a first radius measured with respect to said axis of rotation, said extension duct downstream end has a second radius that is larger than said first radius.

18. A gas turbine engine in accordance with claim 17 wherein a ratio of said second radius to said first radius is approximately equal to 1.75.

19. A gas turbine engine in accordance with claim 13 wherein said extension duct plurality of panels further comprise twelve panels coupled together circumferentially.

20. A gas turbine engine in accordance with claim 13 wherein at least one of said first rotor assembly and said second rotor assembly comprises a counter-rotating rotor assembly.

* * * * *

UNITED STATES PATENT AND TRADEMARK OFFICE
CERTIFICATE OF CORRECTION

PATENT NO. : 6,935,837 B2 Page 1 of 1
APPLICATION NO. : 10/376892
DATED : August 30, 2005
INVENTOR(S) : Moniz et al.

It is certified that error appears in the above-identified patent and that said Letters Patent is hereby corrected as shown below:

In Claim 8, column 5, line 17, between "at" and "one" insert -- least --.

Signed and Sealed this

Twentieth Day of November, 2007

JON W. DUDAS
*Director of the United States Patent and Trademark Office*